(12) United States Patent
Athad

(10) Patent No.: US 9,616,585 B2
(45) Date of Patent: Apr. 11, 2017

(54) SLITTING TOOL CONFIGURED FOR FINE-TUNING

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 81 days.

(21) Appl. No.: 13/917,404

(22) Filed: Jun. 13, 2013

(65) Prior Publication Data
US 2014/0013916 A1 Jan. 16, 2014

Related U.S. Application Data

(60) Provisional application No. 61/670,805, filed on Jul. 12, 2012.

(51) Int. Cl.
| | |
|---|---|
| *B23C 5/08* | (2006.01) |
| *B26D 3/12* | (2006.01) |
| *B23D 61/04* | (2006.01) |
| *B23D 61/02* | (2006.01) |
| *B23C 5/22* | (2006.01) |

(52) U.S. Cl.
CPC .................. *B26D 3/12* (2013.01); *B23C 5/08* (2013.01); *B23C 5/22* (2013.01); *B23D 61/025* (2013.01); *B23D 61/04* (2013.01); *B23C 2210/161* (2013.01); *Y10T 83/9372* (2015.04); *Y10T 83/9403* (2015.04)

(58) Field of Classification Search
CPC .... B26D 3/12; B23C 5/22; B23C 5/08; B23C 2210/161; Y10T 407/134; Y10T 83/9403; Y10T 83/9372; B23D 61/04; B23D 61/025

USPC ... 83/835–855; 407/73, 77, 87, 44, 45, 50, 9
See application file for complete search history.

(56) References Cited

U.S. PATENT DOCUMENTS

| | | | |
|---|---|---|---|
| 2,190,492 A | 7/1938 | Staples | |
| 2,266,339 A | 12/1941 | Shutz | |
| 2,753,617 A | 7/1956 | Felenchak | |
| 3,097,548 A * | 7/1963 | Johnson | 408/156 |
| 3,817,305 A * | 6/1974 | Gibbs | B27G 13/04 |
| | | | 144/172 |
| 4,142,811 A * | 3/1979 | Burnham | 403/290 |

(Continued)

FOREIGN PATENT DOCUMENTS

| | | |
|---|---|---|
| DE | 1001113 | 1/1957 |
| DE | 100 11 113 A1 | 9/2001 |
| DE | 202005019134 | 3/2006 |

OTHER PUBLICATIONS

International Search Report dated Feb. 6, 2014 issued in PCT counterpart application (No. PCT/IL2013/050532).

(Continued)

*Primary Examiner* — Kenneth E. Peterson
*Assistant Examiner* — Nhat Chieu Do
(74) *Attorney, Agent, or Firm* — Womble Carlyle

(57) ABSTRACT

A slitting tool configured for fine-tuning thereof includes basic body, which in turn includes a body portion and a cutting portion extending therefrom. The slitting tool includes a biasing screw which is seated in a biasing bore and is configured to adjust the position of the cutting portion. The biasing screw is configured to engage a biasing surface of the body portion to adjust the cutting portion's position. The biasing surface is oblique relative to the biasing screw for retarding movement of the biasing screw a fine-tuned position.

22 Claims, 3 Drawing Sheets

(56) References Cited

U.S. PATENT DOCUMENTS

| | | | |
|---|---|---|---|
| 4,428,704 A * | 1/1984 | Kalokhe | B23B 29/03421 407/37 |
| 4,780,029 A | 10/1988 | Beck | |
| 4,801,224 A | 1/1989 | Pettersson et al. | |
| 5,090,845 A * | 2/1992 | Bentjens | 407/52 |
| 5,647,699 A * | 7/1997 | Martin et al. | 407/33 |
| 8,449,225 B2 | 5/2013 | Gati | |
| 2003/0010178 A1* | 1/2003 | Trimpe et al. | 83/840 |
| 2004/0098000 A1* | 5/2004 | Kleinwaechter | 606/167 |
| 2006/0147281 A1 | 7/2006 | Nagaya et al. | |

OTHER PUBLICATIONS

Chinese Office Action with Search Report dated Feb. 1, 2016, issued in CN counterpart application (No. 201380036817.8).

\* cited by examiner

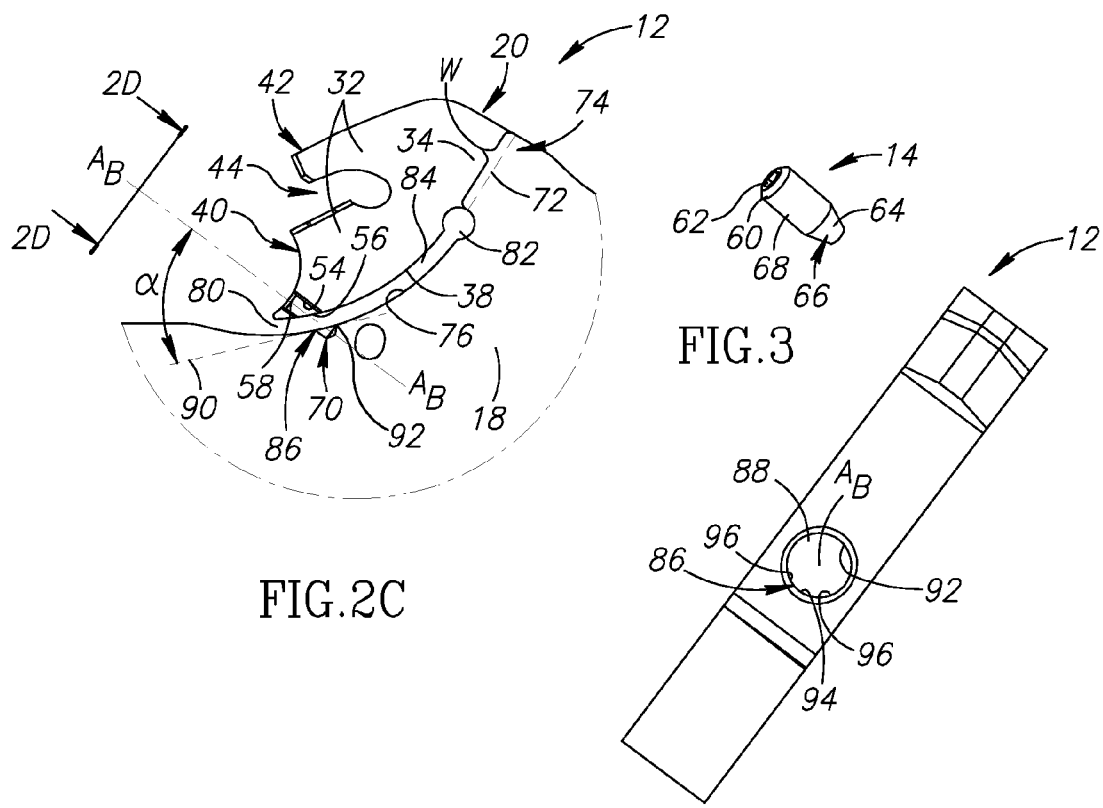
FIG.2C
FIG.3
FIG.2D
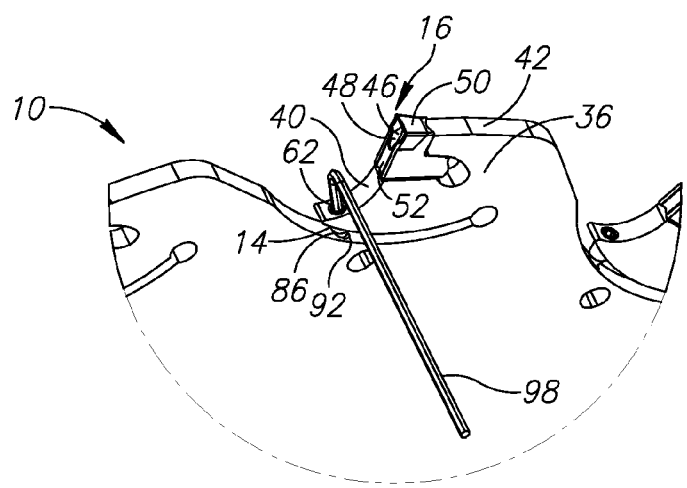
FIG.4

SLITTING TOOL CONFIGURED FOR FINE-TUNING

RELATED APPLICATIONS

The present application claims priority to U.S. Provisional Patent Application No. 61/670,805, filed 12 Jul. 2012. The contents of the aforementioned application are incorporated by reference in their entirety.

FIELD OF THE INVENTION

The subject matter of the present application relates generally to a slitting tool designed for a metal-working machine, and in particular a slitting tool basic body of a slitting tool, having a body portion and a cutting portion extending therefrom, and being configured for fine-tuning of the position of the cutting portion relative to the body portion.

BACKGROUND OF THE INVENTION

Slitting tool basic bodies which are configured for slitting/slotting applications can be provided with one or more cutting portions.

Such cutting portions can each be provided with cutting edges formed on removable cutting inserts mounted in insert pockets, or, alternatively, cutting portions can be formed with integral cutting edges.

Fine-tuning of a position of a cutting portion and consequently the cutting edge thereof is particularly desirable for high-precision cutting operations.

An example of an adjustable tool is disclosed in U.S. Pat. No. 2,190,492.

SUMMARY OF THE INVENTION

The present application relates to a slitting tool and components thereof, in particular a basic body thereof. For the purpose of the specification and claims, the name "slitting tool" is intended to be inclusive of tools configured for slitting or slotting applications. The difference between a slit and a slot being the width thereof, with a slit being relatively thinner than a slot.

Nonetheless, it will be understood that the construction of the subject matter of the present application can be particularly advantageous for tools configured specifically for slitting applications which normally comprise at least a cutting portion thereof with a narrow construction. It will be understood that some of the features described below are suitable for tools or components thereof with narrow constructions.

In accordance with one aspect of the subject matter of the present application, a slitting tool basic body has opposing first and second side surfaces connected by a peripheral edge. The basic body further comprises a body portion; at least one cutting portion extending from the body portion and connected thereto by a neck section thereof; a groove separating the body portion from the cutting portion, the groove having a first groove surface formed on the body portion and a second groove surface formed on the cutting portion, the groove further having a front end portion remote from the neck section, a rear end portion proximate to the neck section and a central portion extending therebetween; a biasing bore formed in the cutting portion and opening out to the second groove surface, the biasing bore having a biasing axis extending through a center thereof; and a biasing surface formed on the first groove surface and located within a plan view of the biasing bore, the biasing surface being obliquely oriented relative to the biasing axis.

In accordance with a different aspect of the subject matter of the present application, a slitting tool basic body comprises a body portion, at least one cutting portion extending from the body portion, and a biasing bore formed in the cutting portion and having an opening facing the body portion; the biasing bore having a biasing axis extending through a center thereof; the body portion comprises a biasing surface located within a plan view of the biasing bore, the biasing surface being obliquely oriented relative to the biasing axis.

In accordance with another aspect of the subject matter of the present application, a slitting tool comprises a slitting tool basic body with a biasing screw located in a biasing bore. The biasing screw has a first end configured to mate with a fastening tool, a second end configured to press against a biasing surface and a screw body portion extending between the first and second ends. The slitting tool is adjustable between an initial position in which the biasing screw and biasing surface are not in contact with one another, and a final position in which the second end of the biasing screw presses against the biasing surface and the cutting portion is repositioned, relative to the body portion, to a fine-tuned position.

In accordance with yet another aspect of the subject matter of the present application, there is provided a slitting tool comprising a basic body and holding a biasing screw. The basic body comprises a body portion and a cutting portion flexibly and elastically connected thereto. The biasing screw is seated in a biasing bore and is configured to adjust the position of the cutting portion by abutment with a biasing surface of the body portion. The biasing surface is oblique relative to a biasing axis of the bore to retard movement of the biasing screw during a cutting operation.

In accordance with another aspect of the subject matter of the present application, there is provided a slitting tool comprising a basic body, and a biasing screw; the basic body comprising a body portion, a flexible and elastic cutting portion extending from the body portion, and a groove defined between opposing first and second groove surfaces formed on the body portion and cutting portion respectively; the cutting portion being formed with a biasing bore; the biasing bore having a biasing axis extending through a center thereof, holding the biasing screw, and opening out to the second groove surface; the biasing screw comprising a first end formed with a tool receiving arrangement, a second end comprising a screw abutment surface, and a screw body portion extending between the first and second ends; the first groove surface comprising a biasing surface located within a plan view of the biasing bore; the slitting tool being configured to be brought from an initial position, in which the biasing screw and biasing surface are not in contact, to a final position in which the biasing screw and biasing surface are in abutting contact and the cutting portion is repositioned, relative to the body portion, to a fine-tuned position; the biasing surface being obliquely oriented relative to the biasing axis for retarding movement of the biasing screw in the second position.

In accordance with still another aspect of the subject matter of the present application, there is provided a slitting tool basic body. The basic body comprising a body portion and a cutting portion flexibly and elastically connected thereto. The body portion being formed with a conically shaped biasing recess associated with a biasing surface. The cutting portion being formed with a threaded biasing bore which is aligned with the biasing recess.

In accordance with yet another aspect of the subject matter of the present application, there is provided a method of fine tuning a slitting tool comprising a basic body, and a biasing screw; the basic body comprising a body portion, a flexible and elastic cutting portion extending from the body portion, and a groove defined between opposing first and second groove surfaces formed on the body portion and cutting portion respectively; the cutting portion being formed with a biasing bore; the biasing bore having a biasing axis extending through a center thereof and holding the biasing screw, and opening out to the second groove surface; the biasing screw comprising a first end formed with a tool receiving arrangement, a second end comprising a screw abutment surface, and a screw body portion extending between the first and second ends; the first groove surface comprising a biasing surface; the biasing surface being obliquely oriented relative to the biasing axis; the method comprising moving the biasing screw's second end against the biasing surface until a desired position of the cutting portion is reached.

It will be understood that the above-said is a summary, and that any of the aspects above may further comprise any of the features described hereinbelow. Specifically, the following features, either alone or in combination, may be particularly applicable to any of the above aspects:

A. A slitting tool or basic body can be configured for slitting operations only.
B. A basic body can comprise opposing first and second side surfaces connected by a peripheral edge.
C. Along a viewing direction perpendicular to one of the first and second side surfaces, an imaginary tangent line touching a biasing surface can form an acute biasing angle α with the biasing axis which fulfills the condition: $35°<α<65°$. More precisely, a preferred biasing angle α can be about 50°.
D. A basic body can have opposing first and second side surfaces connected by a peripheral edge.
E. A cutting portion can be configured for fine-tuning in a single direction only. In a case where a basic body is disc-shaped, the single direction can be a radial direction.
F. A cutting portion can comprise a head section and a neck section connecting the head section and a body portion of the basic body.
G. A body portion can be disc-shaped.
H. A cutting portion can be one of a plurality of cutting portions. The plurality of cutting portions can be spaced along the periphery of the body portion.
I. A neck section can have a flexural rigidity of 19,280 GPA $mm^4 < F < 28,920$; GPA $mm^4$. More precisely, a preferred flexural rigidity can be about 24,100 GPA $mm^4$.
J. A head section can comprise a cutting edge or cutting insert seat.
K. A groove can extend from a peripheral edge of a basic body to a neck section thereof, located between the head section and body portion.
L. A groove can be defined between a cutting portion and a body portion of a basic body. More precisely, the groove can be defined by a head section, neck section and body portion of a basic body.
M. A groove can be arc-shaped.
N. A groove can comprise a front end portion, a rear end portion, and a central portion extending therebetween.
O. Front and rear end portions can each tend from the central portion to a location closer to a peripheral edge of the basic body than the central portion. It is believed that a groove shape providing more material near a cutting edge or insert pocket may have advantageous constructional stability over a different groove shape.
P. A biasing bore can be threaded.
Q. A biasing bore can be a through-bore opening out to two opposing sides of a cutting portion.
R. A biasing bore can form an acute bore angle with a radial direction of a basic body.
S. A diameter of a biasing bore can be greater than half a thickness measured between opposing first and second side surfaces of a basic body at the biasing bore's location.
T. A biasing bore and/or biasing screw can comprise a rotation inhibitor arrangement. A rotation inhibitor arrangement can be a patch, or pitch smaller than that defined by the standard DIN 913 ISO 4026.
U. A biasing bore can open out to a rake portion of a cutting portion. In such case, a biasing screw can be recessed relative to the rake portion. A biasing bore can open out to a peripheral edge at a rake portion thereof.
V. A rake portion can have an arc-shape.
W. A biasing surface can be a part of a biasing recess extending into a body portion. In a plan view of a biasing bore, the biasing surface can have a V-shape or U-shape.
X. A biasing recess can have a conical shape.
Y. A biasing screw can have a threaded screw body portion.
Z. A second end of biasing screw can be configured for contacting or can contact only the biasing surface.
AA. A biasing screw can be of a headless type.
BB. A biasing screw can have a second end having a tapered shape.
CC. A cutting edge of a cutting portion, located either on a cutting edge of a cutting insert which is held in an insert pocket of the cutting portion or integrally formed on the cutting edge, can have a cutting width greater than a thickness of a remainder of the cutting portion.
DD. A slitting tool can comprise one or more cutting inserts.
EE. A slitting tool can be part of a kit comprising a fastening tool key configured to engage a tool receiving recess of about 0.9 mm.

It will be understood that some of the features above, either alone or in combination, can assist in inhibiting or retarding movement of a biasing screw in a biasing bore, which can be of particular benefit where maintenance of a precise fine-tuning position of a cutting portion is desired. Additionally, some features above can possibly facilitate a compact construction particularly suitable for a slitting tool.

It will be understood that, in accordance with one theory, when the biasing screw is abutted against the biasing surface, fine-tuning of the position of the cutting portion is performed through application of a fine-tuning force applied on the cutting portion in a direction which is non-parallel with the biasing axis. Such non-axial force application can force threading of the biasing screw against threading of the biasing bore, reducing relative movement (caused during, for example, a cutting operation; in particular preventing undesired movement due to vibration during a cutting operation).

Another possible benefit of the oblique or slanted biasing arrangement can be a desired decrease in sensitivity, thereby requiring a greater application of torque on a fastening tool to actuate a biasing screw or to reduce undesirable effects of vibration during a cutting operation.

BRIEF DESCRIPTION OF THE DRAWINGS

FIG. 2C is an enlarged view of a portion of the basic body in FIG. 2A;

FIG. 2D is an enlarged view taken along line 2B-2B in FIG. 2A;

FIG. 3 is a perspective view of a biasing screw; and

FIG. 4 is an enlarged perspective view of a portion of the slitting tool in FIGS. 1A to 1C.

DETAILED DESCRIPTION

Figure 1A:
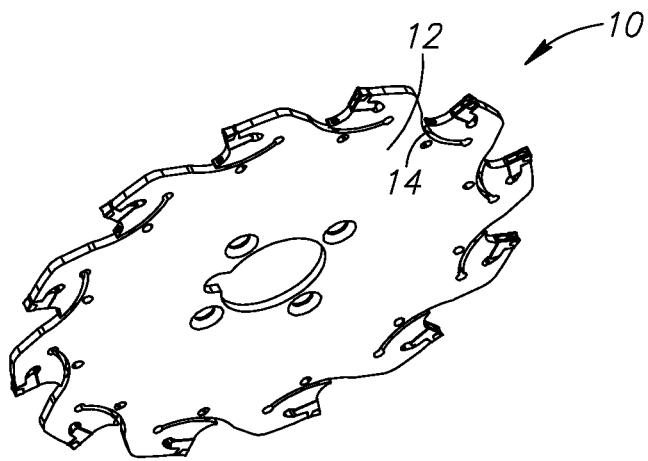
FIG. 1A is a perspective view of a slitting tool.
Figure 1B:
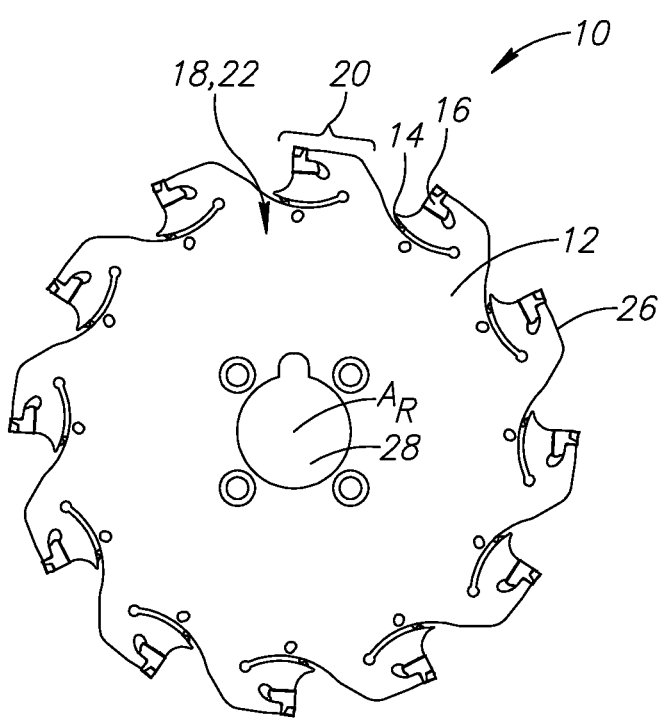
FIG. 1B is a side view of the slitting tool in FIG. 1A.
Figure 1C:
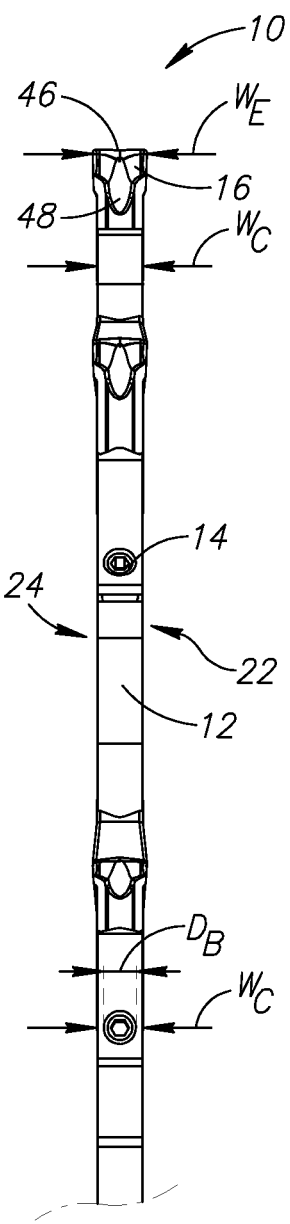
FIG. 1C is an enlarged end view of a portion of the slitting tool in FIGS. 1A and 1B.

Reference is made to FIGS. 1A to 1C, which illustrates a slitting tool 10.

The slitting tool 10 can comprise a basic body 12, one or more biasing members in the form of biasing screws 14 and one or more cutting inserts 16.

The basic body 12 can comprise a body portion 18 and one or more flexible and elastic cutting portions 20 extending therefrom. For example there can be a plurality of cutting portions 20 which are spaced-apart from each other.

The basic body 12 can also comprise opposing first and second side surfaces 22, 24 connected by a peripheral edge 26.

According to some embodiments, the basic body 12 and, in general, the slitting tool 10, can be configured to rotate about a central axis of rotation $A_R$ and a direction of rotation.

The body portion 18 can be disc-shaped and can be formed with a shaft receiving recess 28 in a center thereof.

Figure 2A:
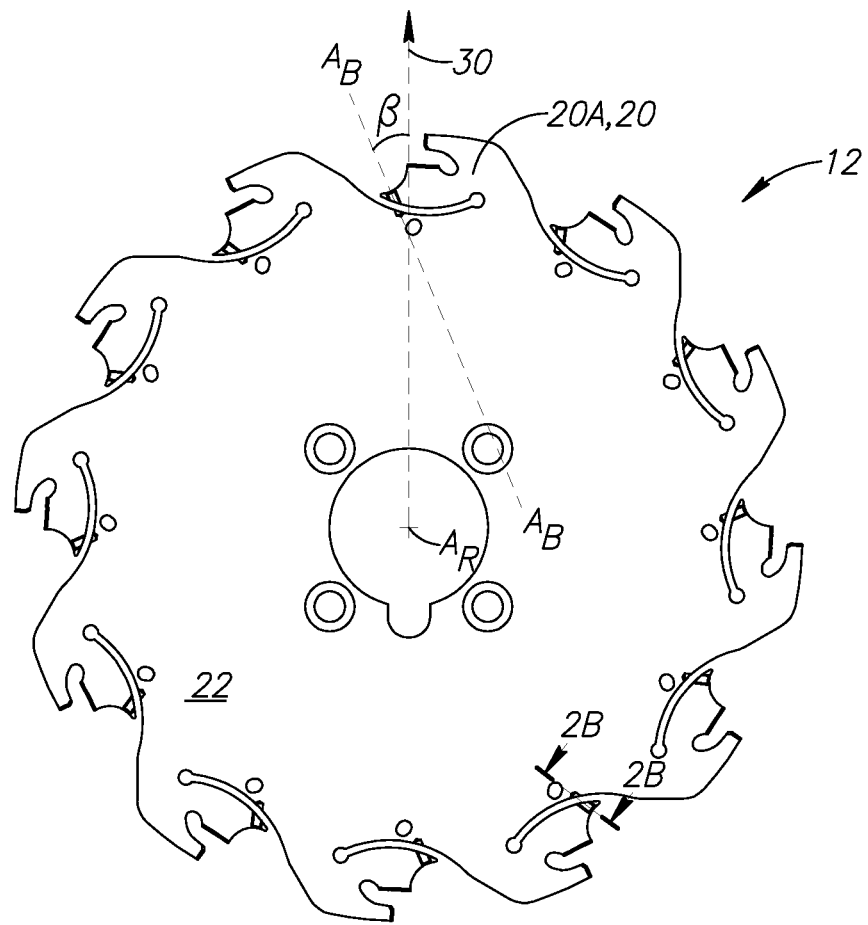
FIG. 2A is a side view of a basic body of the slitting tool in FIGS. 1A to 1C.

Referring to FIG. 2A, during fine tuning of one of the cutting portions (for ease of explanation referring specifically here to a cutting portion designated as 20A), the slitting tool can be configured to move the cutting portion 20A in a single direction only, shown by arrow 30. In embodiments where the basic body 12 is round, e.g. disc-shaped, the single direction 30 can also be a radial direction of the basic body 12.

Notably, such construction, i.e. only having elements or shapes configured for single directional adjustment, may be advantageous for slitting tools which require compact construction, to allow particularly thin slits to be cut (e.g., a particularly thin slit could be quantified as one which has a width of 8 mm or less; however, it will be understood that the significance of the compact design increases correspondingly with reduction of a desired slit width; it is noted that the example slitting tool 10 shown is designed for producing slits of 3 mm width).

Figure 2B:
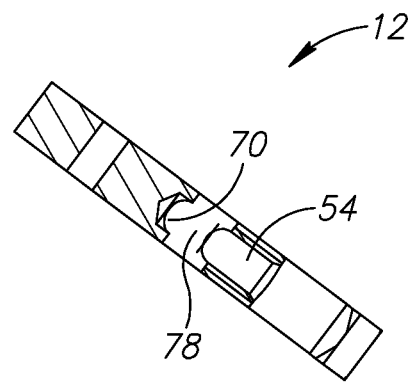
FIG. 2B is an enlarged cross section view taken along line 2B-2B in FIG. 2A.

Referring to FIGS. 2A to 2C, each cutting portion 20 can comprise a head section 32 and a neck section 34 connecting the head section 32 and the body portion 18.

The head section 32 can be defined between the neck section 34 and the peripheral edge 26, and from the first side surface 22 to the second side surface 24. More precisely, portions of the peripheral edge 26 which bound the head section 32 can be a second groove surface 38, a rake portion 40, and a relief portion 42.

Referring to FIG. 4, to elaborate, in embodiments where the head section 32 is formed with an insert pocket 44 configured to hold an associated cutting insert 16, the cutting insert 16 can comprise a cutting edge 46 at an intersection of a rake surface 48 (which can in turn be formed with a chip-breaking or controlling configuration), over which chips (not shown) from a cut workpiece (not shown) flow, and a relief surface 50 thereof.

The rake portion 40 can extend from the cutting insert's rake surface 48 or a cutting insert surface 52 extending therefrom, and can be similarly configured for chips (not shown) to flow thereover. For example, the rake portion 40 can have an arc-shape, as shown, for directing chip flow.

The relief portion 42 can extend from the cutting insert's relief surface 50 and can be shaped to provide the same relief function (e.g., receding from the cutting edge 46).

As shown in FIG. 1C, the cutting edge 46 has a width $W_E$ wider than a width $W_C$ of a remainder of the cutting portion 20 (which can also be, as in this example, the width of the entire basic body 12, excluding other cutting edges 46, in embodiments where such are present) for achieving slitting or slotting operations.

Reverting to FIG. 2C, the head section 32 can be formed with a single, internally threaded biasing bore 54. As can be seen from FIGS. 2A and 2C, the biasing bore 54 is rotationally forward of the relief portion 42.

The biasing bore 54 has a biasing axis $A_B$ extending through the center thereof. The biasing bore 54 can be a through-bore and can open out at a first end 56 thereof to the second groove surface 38 and at a second end 58 thereof to the rake portion 40.

As shown in FIG. 2A, the biasing bore 54 can form an acute bore angle β with the radial direction 30 of the basic body 12.

As shown in FIG. 1C, a diameter $D_B$ of the biasing bore 54 can be greater than half of a thickness $W_C$, which is measured between the first and second side surfaces 22, 24.

As shown in FIG. 1B, each biasing screw 14 is held by the biasing bore 54 such that the biasing screw 14 does not project to the rake portion 40, i.e., is recessed relative to the rake portion 40, and can allow unimpeded flow of chips there across.

Referring to FIG. 3, the biasing screw 14 is shown in more detail. The biasing screw 14 can be of a headless type shown (i.e. free of an enlarged head which cannot be completely enclosed within the biasing bore 54, which can allow unimpeded flow of chips there above). The biasing screw 14 can comprise a first end 60 formed with a tool receiving arrangement, for example a recess, 62, a second end 64 comprising a screw abutment surface 66, and a threaded screw body portion 68 extending between the first and second ends 60, 64.

Preferably, the second end 64 can have a tapered shape (for example frustoconical, as shown), which can be advantageous, for example, when a biasing recess 70 (FIG. 2C) is utilized.

Reverting to FIG. 2C, the basic body 12, or at least the cutting portion 20, can be made of a suitable material to provide the flexible and elastic quality desired for fine-tuning, for example steel.

It will be understood that a flexural rigidity F of the neck section 34 can also affect the functionality thereof. Using a cross section (taken at a dotted line designated as 72) of a hinge portion 74 of the neck section 34, a preferred construction can fulfill the condition $(E \cdot I = [E(t \cdot w^3/12)])$, wherein E is Young's modulus, I is a moment of inertia, t is a thickness dimension of the tool body at the hinge portion 74 and corresponds to $W_C$ (FIG. 1C) in this example, and w is a width dimension of the tool body at the hinge portion 74 (FIG. 2C). Accordingly, the neck section 34 can have a flexural rigidity F of 19,280 GPA mm$^4$<F<28,920 GPA mm$^4$. More precisely, the preferred value found so far for flexural rigidity is about 24,100 GPA mm$^4$.

The peripheral edge 26 can also comprise a first groove surface 76 opposite the second groove surface 38. More precisely, the first and second groove surfaces 76, 38 can define a groove 78, which is preferably arc-shaped.

To elaborate, the groove 78 can extend from a front end portion 80 (which can be considered an opening at a periphery of the basic body 12) to a rear end portion 82, and can comprise a central portion 84 extending therebetween. The front end portion 80 is remote from the neck section 34 while the rear end portion 82 is proximate to the neck section 34. In a side view of the basic body along the axis of rotation ($A_R$), the groove's peripheral opening 80 is rotationally forward of the neck section 34.

The orientation of the arc-shape can allow a preferred amount of material near a cutting edge 46 allowing constructional stability (in contrast with a straight groove or arc having a central portion thereof being the most distal portion from a body portion 18).

The first groove surface 76 comprises a biasing surface 86. In the plan view of the biasing bore 54 show in FIG. 2D, the biasing surface 86 has a U-shape as it is constituted by a portion of an unthreaded biasing recess 88. The first groove surface 76 is devoid of threading, as shown. As such, the biasing bore 54 is the only threaded bore opening out to the groove 78.

It will be understood that in embodiments free of such biasing recess 88, a biasing surface 86 could be, for example, merely constituted by a portion of the first groove surface 76.

Reverting to FIG. 2C, in either case along a viewing direction perpendicular to one of the first and second side surfaces 22, 24, an imaginary tangent line 90 touching the biasing surface 86 can form an acute biasing angle α with the biasing axis which fulfills the condition: $35°<\alpha<65°$. More precisely, the preferred value found so far for biasing angle α is about 50°.

In all cases, the biasing surface 86 is obliquely oriented relative to the biasing axis. Stated differently, the biasing screw 14 does not abut a surface perpendicular to a longitudinal axis thereof.

In embodiments comprising a biasing recess 88, the biasing screw 14 only contacts one side of the biasing recess 88 (shown best in FIG. 4), i.e. the contacted edge of the biasing recess 88 being the biasing surface 86, and the remainder of the biasing recess' edge being a non-contacting surface 92.

More precisely, the biasing surface 86 can have a central portion 94 having two branch portions 96 extending from opposing sides thereof to form, in this example, a U-shape (FIG. 2D). the central portion 94 can provide a biasing force necessary to fine tune the associated cutting portion 20, and each branch portion 96 can prevent lateral motion or, stated differently, stabilize, the cutting portion 20 during a cutting operation.

While not easily viewable in FIG. 2D, it will be understood that the biasing recess 88 can have a conical shape.

In operation, the cutting portion 20 can be in an initial position (not shown), in which the biasing screw 14 and biasing surface 86 are not in contact.

Referring to FIG. 4, a fastening tool 98 can be rotated in a first direction to turn the biasing screw 14 via the tool receiving recess 62 thereof until the cutting portion 20 is bent to an extreme intermediate position in which the biasing screw 14 and biasing surface 86 are in abutting contact and the screw has passed through all possible desired fine-tuned positions.

The fastening tool 98 can then be rotated in a second direction, opposite to the first direction, until a final position (shown in FIG. 4) is reached. In the final position the biasing screw 14 and biasing surface 86 are still in abutting contact, but with the cutting portion being repositioned to a desired fine-tuned position. It is understood that in both the extreme intermediate position and in the final position, a single biasing screw 14 passes through the single, threaded biasing bore 54, connects to both groove surfaces 76, 38 and pushes on the biasing surface 86 to apply a separating force between the body portion 18 and the flexible and elastic cutting portion 20. As such, in the assembled tool, the biasing screw 14 is the only element located in the groove 78 and contacting both the first groove surface 76 and the second groove surface 38.

The fastening tool 98 used, and possibly sold or otherwise included with the slitting tool 10 as part of a kit can preferably be a relatively small tool (for example, an Allen key of about 0.9 mm) for suitably complementing the above-mentioned decreased sensitivity.

The description above includes exemplary embodiments but does not exclude non-exemplified embodiments and details, all of which fall within the claim scope of the present application.

What is claimed is:

1. A slitting tool basic body having opposing first and second side surfaces connected by a peripheral edge, and further comprising:
    a disc-shaped body portion having an axis of rotation ($A_R$) and a direction of rotation;
    at least one cutting portion extending from the body portion and connected thereto by a neck section thereof, the at least one cutting portion having a head portion provided with a relief portion and a rake portion;
    a groove separating the body portion from the cutting portion and having a peripheral opening that is rotationally forward of the neck section in a side view of the body portion along the axis of rotation ($A_R$), the groove having a first groove surface formed on the body portion and a second groove surface formed on the cutting portion, the groove further having a front end portion remote from the neck section, a rear end portion proximate to the neck section and a central portion extending therebetween;
    a threaded biasing bore formed in the cutting portion and opening out to the second groove surface, the biasing bore having a biasing axis extending through a center thereof; and
    a biasing surface formed on the first groove surface and located within a plan view of the biasing bore, the biasing surface being obliquely oriented relative to the biasing axis at the intersection thereof; wherein:
    the biasing bore is formed rotationally forward of the relief portion, in said side view; and
    a biasing screw occupies the biasing bore and contacts the biasing surface, the biasing screw being the only element located in the groove and contacting both the first groove surface and the second groove surface,
    the threaded biasing bore is the only threaded bore opening out to the groove.

2. The slitting tool basic body according to claim 1, wherein along a viewing direction perpendicular to one of the first and second side surfaces, an imaginary tangent line touching the biasing surface forms an acute biasing angle (α) with the biasing axis which fulfills the condition: $35°<\alpha<65°$.

3. The slitting tool basic body according to claim 1, wherein the neck section has a flexural rigidity F within the range 19,280 GPA mm$^4$<F <28,920 GPA mm$^4$, and preferably about 24,100 GPA mm$^4$.

4. The slitting tool basic body according to claim 1, wherein the biasing surface is a part of a biasing recess extending into the body portion.

5. The slitting tool basic body according to claim 4, wherein the biasing recess has a conical shape.

6. The slitting tool basic body according to claim 1, wherein the front and rear end portions each extends from the central portion to a location closer to a peripheral edge of the basic body than the central portion.

7. The slitting tool basic body according to claim 1, wherein the cutting portion is one of a plurality of cutting portions spaced along the periphery of the body portion.

8. The slitting tool basic body according to claim 1, wherein the cutting portion is configured for fine-tuning in a single direction only.

9. The slitting tool basic body according to claim 8, wherein the cutting portion is configured for fine-tuning only in a radial direction of the body portion.

10. The slitting tool basic body according to claim 9, wherein the biasing bore forms an acute bore angle with the radial direction.

11. The slitting tool basic body according to claim 1, wherein a cutting edge of the cutting portion has a cutting width greater than a thickness of a remainder of the cutting portion, wherein the cutting width is 8 mm or less.

12. The slitting tool basic body according to claim 1, wherein the biasing bore opens out to the rake portion of the cutting portion.

13. The slitting tool basic body according to claim 12, wherein the rake portion has an arc-shape.

14. The slitting tool basic body according to claim 12, wherein the rake portion forms part of the peripheral edge.

15. The slitting tool basic body according to claim 1, wherein a diameter of the biasing bore is greater than half a thickness measured between the first and second side surfaces of the basic body at the biasing bore's location.

16. The slitting tool basic body according to claim 1, wherein the biasing surface is a part of an unthreaded biasing recess extending into the body portion.

17. A slitting tool comprising:
a slitting tool basic body comprising:
opposing first and second side surfaces connected by a peripheral edge;
a disc-shaped body portion having an axis of rotation ($A_R$) and a direction of rotation;
at least one cutting portion extending from the body portion and connected thereto by a neck section thereof, the at least one cutting portion having a head portion provided with a relief portion and a rake portion;
a groove separating the body portion from the cutting portion and having a peripheral opening that is rotationally forward of the neck section in a side view of the body portion along the axis of rotation ($A_R$), the groove having a first groove surface formed on the body portion and a second groove surface formed on the cutting portion, the groove further having a front end portion remote from the neck section, a rear end portion proximate to the neck section and a central portion extending therebetween;
a threaded biasing bore formed in the cutting portion and opening out to the second groove surface, the threaded biasing bore is the only threaded bore opening out to the groove, the biasing bore having a biasing axis extending through a center thereof; and
a biasing surface formed on the first groove surface and located within a plan view of the biasing bore, the biasing surface being obliquely oriented relative to the biasing axis at an intersection thereof; and
a biasing screw located in the biasing bore, the biasing screw having a first end configured to mate with a fastening tool, a second end configured to press against the biasing surface and a screw body portion extending between the first and second ends;
wherein:
the biasing bore is formed rotationally forward of the relief portion, in said side view;
the slitting tool is adjustable between:
an initial position in which the biasing screw and biasing surface are not in contact with one another, and
a final position in which the second end of the biasing screw presses against the biasing surface and the cutting portion is repositioned, relative to the body portion, to a fine-tuned position;
the biasing screw is the only element located in the groove and contacting both the first groove surface and the second groove surface, when the slitting tool is in the final position; and
the at least one cutting portion comprises one or more cutting edges which collectively protrude beyond both the first and second surfaces in an axial direction along the axis of rotation ($A_R$), and establish a width of cut of the slitting tool.

18. The slitting tool according to claim 17, wherein the second end of the biasing screw contacts only the biasing surface.

19. The slitting tool according to claim 17, wherein the biasing screw is of a headless type.

20. The slitting tool according to claim 17, wherein the biasing screw's second end has a tapered shape.

21. The slitting tool according to claim 17, wherein the biasing screw is recessed relative to the rake portion of the cutting portion.

22. The slitting tool according to claim 17, wherein the biasing bore and/or the biasing screw further comprises a rotation inhibitor arrangement.

* * * * *